United States Patent [19]

Bouvot

[11] Patent Number: 4,875,388
[45] Date of Patent: Oct. 24, 1989

[54] DEVICE OF THE CRANK CONNECTING ROD TYPE, IN PARTICULAR FOR CONTROLLING A VENTILATION LOUVER IN AN AUTOMOBILE HEATING OR AIR CONDITIONING UNIT

[75] Inventor: Jean F. Bouvot, Dampierre, France
[73] Assignee: VALEO, Paris, France
[21] Appl. No.: 238,101
[22] Filed: Aug. 30, 1988

[30] Foreign Application Priority Data

Sep. 10, 1987 [FR] France ................................ 87 12571

[51] Int. Cl.⁴ .......................... G05G 1/00; B60H 1/00
[52] U.S. Cl. .................................... 74/579 R; 74/595; 74/600; 403/163
[58] Field of Search ................. 74/579 R, 580, 44, 42, 74/47, 600, 595; 403/163, 161, 162, 69, 70, 71, 14, 24; 384/129, 439, 539, 429, 430, 584

[56] References Cited

U.S. PATENT DOCUMENTS

| 150,803 | 5/1874 | Timms | 403/163 |
|---|---|---|---|
| 487,403 | 12/1892 | Clark | 403/163 |
| 666,794 | 1/1901 | Birkett | 403/163 |
| 2,141,720 | 12/1938 | Marsh | 74/600 |
| 3,231,300 | 1/1966 | Moroney | |
| 3,424,014 | 1/1969 | Harris | 74/44 |
| 4,263,821 | 4/1981 | Savage et al. | 384/252 X |
| 4,802,382 | 2/1989 | Nissels | 74/579 R |

FOREIGN PATENT DOCUMENTS

| 57826 | 4/1953 | France | 403/161 |
|---|---|---|---|
| 2547398 | 12/1984 | France . | |

OTHER PUBLICATIONS

Patent Abstracts of Japan, vol. 9, No. 330, Dec. 25, 1985 JP-A-60 161 212 .
Patent Abstracts of Japan, vol. 11, No. 278, Sep. 9, 1987 JP-A-62 77 215.

Primary Examiner—Rodney M. Lindsey
Attorney, Agent, or Firm—Dennison, Meserole, Pollack & Scheiner

[57] ABSTRACT

A device of the crank connecting rod type is proposed, including a crank arm (10) capable of being mounted to swivel about an axis (X—X) and provided with a pivot (14) which can be engaged by a connecting rod (16), which includes an extension (18) parallel to the axis of the pivot (14) and extended, beyond a crank connecting rod bearing face (20), by a radial tooth (22) arranged to remain in engagement with a rim (24) of the crank arm in any crank connecting rod operating position.

10 Claims, 2 Drawing Sheets

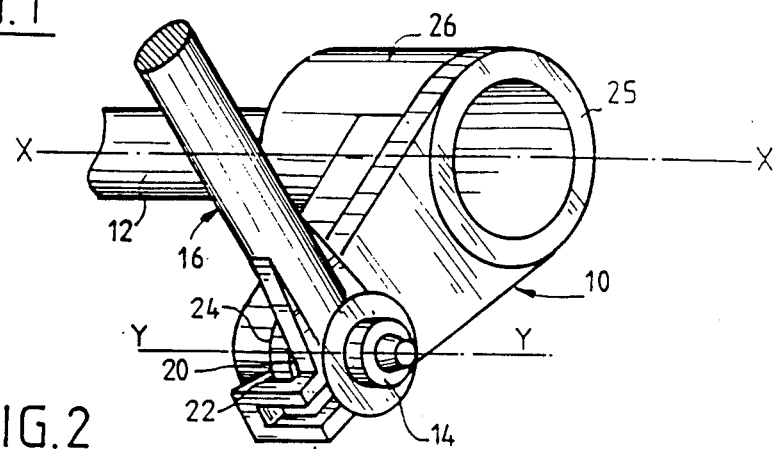
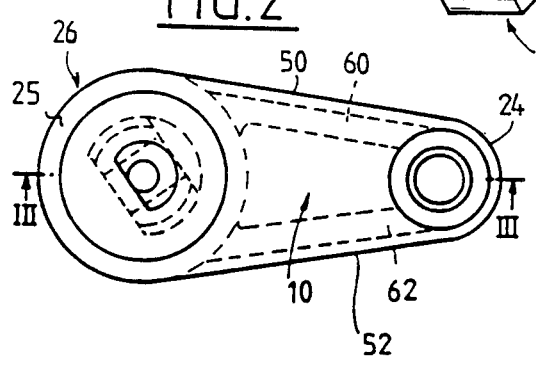
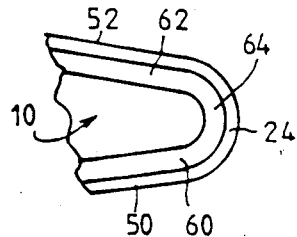
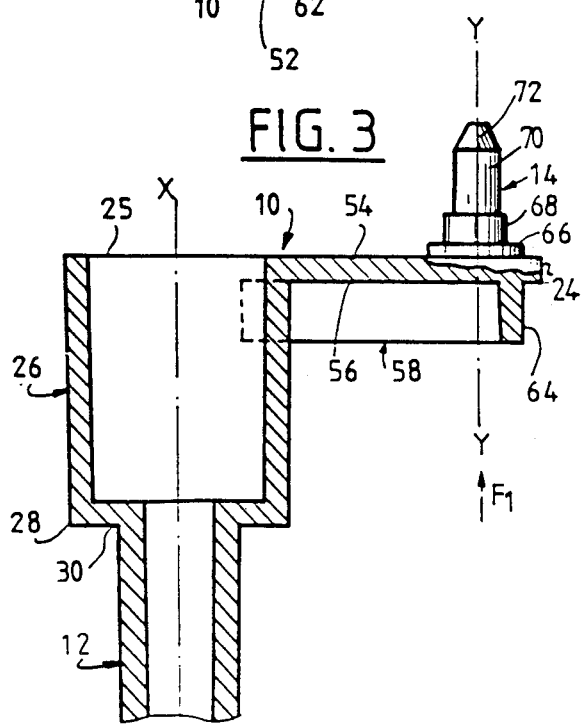

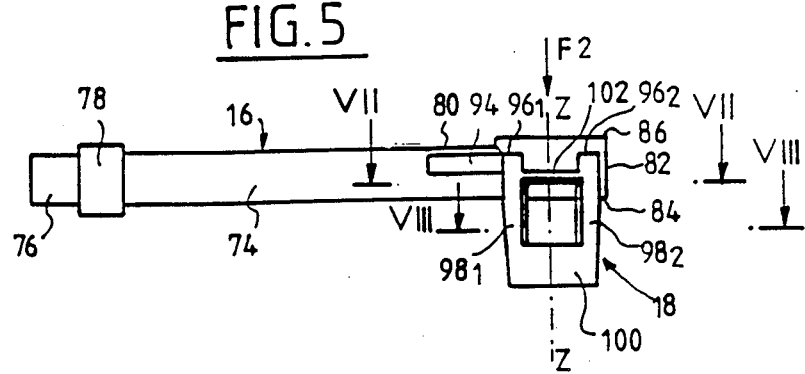
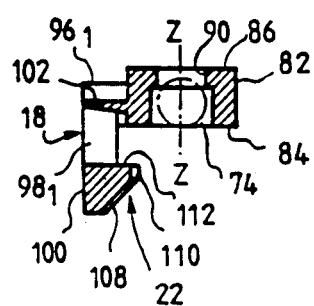
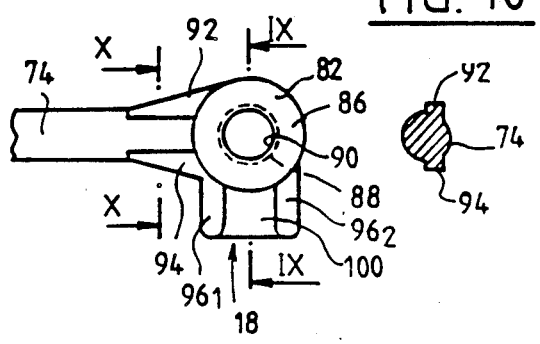
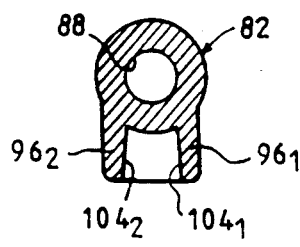
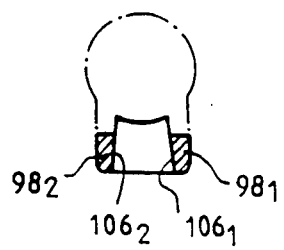

1

DEVICE OF THE CRANK CONNECTING ROD TYPE, IN PARTICULAR FOR CONTROLLING A VENTILATION LOUVER IN AN AUTOMOBILE HEATING OR AIR CONDITIONING UNIT

FIELD OF THE INVENTION

The invention relates to a device of the crank connecting rod type, which can be used in particular for controlling a ventilation louver in a heating or air conditioning unit for an automobile.

BACKGROUND OF THE INVENTION

Devices of this type which include a crank arm capable of being mounted for swiveling about an axis and provided with a pivot which can be engaged by a connecting rod pivotably connected to the crank arm are already known.

When a device of this type is used for controlling a ventilation louver, the connecting rod is fixed against relative rotation with the louver, and the rotational displacement of the louver is controlled by some appropriate means, such as an actuator that acts upon the connecting rod.

In the sense in which it is currently used, the term "connecting rod" is understood to mean generally any connecting device arranged to be connected to a crank arm in order to transmit motion to the arm or receive motion from it. For example, the connecting rod may comprise a rod of an actuator, or an element mounted on the end of a rod of an actuator.

In known devices of this type, the connecting rod and the crank arm are often made of plastic, and the pivot of the crank passes all the way through the body of the connecting rod, through a hole made in the connecting rod. The free end of the pivot, which protrudes from the connecting rod, then receives a retaining element such as a ring or circlip, to prevent the connecting rod and the crank from becoming separated.

This retaining element can be put in place only with a suitable tool, which sometime's presents problems when the connecting rod and the crank must be mounted in situ, especially in an area where access is difficult, as is the case with automobile heating and air conditioning units.

Moreover, if the connecting rod must be separated from the crank for one reason or another, lifting the retaining element generally causes irreparable damage to the pivot, especially if it is made of plastic.

OBJECT AND SUMMARY OF THE INVENTION

It is accordingly an object of the present invention to avoid the disadvangtages of the crank connecting rod devices of the prior art.

A particular object of the invention is to furnish a crank connecting rod device with which the connecting rod and the crank can be easily mounted, especially in situ, without having to use a tool.

Another object of the invention is to furnish a device of the crank connecting rod type with which the connecting rod and the crank can be separated from one another as needed, without risking damage.

Still another object of the invention is to furnish a device of the crank connecting rod type that is particularly suitable for controlling a ventilation louver in a heating or air conditioning unit for an automobile.

More particular, the invention relates to a device of the crank connecting rod type as generically defined at the outset above.

In an essential feature of the invention, the connecting rod includes an extension which is parallel to the axis of the pivot and is extended, beyond a bearing face of the crank connecting rod, by a radial tooth arranged to remain in engagement with a rim of the crank arm in any operating position of the crank connecting rod.

Thus the connecting rod and the crank remain constantly in engagement, without having to use a retaining device placed on the free end of the pivot. This makes both the mounting and the removal of the device considerably simpler.

In a preferred embodiment of the invention, the extension comprises the second leg of a square the first leg of which depends from the connecting rod and extends perpendicular to the axis of a cylindrical hole made in the connecting rod for the passage of the pivot.

Preferably, the first leg and the second leg of the square are each made of two parallel elements, the elements of the first leg depending from the connecting rod, on the one hand, and from the two elements of the second leg, on the other, the latter being joined together at their free end to form the radial tooth.

Advantageously, the rim of the crank arm is in the form of an arc of a circle centered on the axis of the pivot and inscribed in an angle at least equal to the maximum clearance angle defined by the set of crank connecting rod operating positions.

The ensuing detailed description, which is given solely by way of example, will be made with reference to the drawings.

BRIEF DESCRIPTION OF THE DRAWINGS

FIG. 1 is a fragmentary perspective view of a crank connecting rod device according to the invention;

FIG. 2 is a plan view of the crank arm;

FIG. 3 is a sectional view taken along the line III—III of FIG. 2;

FIG. 4 is a fragmentary view from below of the crank arm, seen in the direction of the arrow $F_1$ in FIG. 3;

FIG. 5 is a side view of the connecting rod;

FIG. 6 is a fragmentary view of the connecting rod seen in the direction of the arrow $F_2$ of FIG. 5;

FIG. 7 is a sectional view taken along the line VII—VII of FIG. 5;

FIG. 8 is a sectional view taken along the line VIII—VIII of FIG. 5;

FIG. 9 is a sectional view taken along the line IX—IX of FIG. 6; and

FIG. 10 is a sectional view taken along the line X—X of FIG. 6.

DESCRIPTION OF THE PREFERRED EMBODIMENTS

The crank connecting rod device shown in FIG. 1 includes a crank arm 10 which is integral with a swivel shaft 12 having an axis X—X and is provided with a pivot 14 that can be engaged by a connecting rod 16. This connecting rod includes an extension 18, which is parallel to the axis of the pivot 14 and is extended beyond a crank connecting rod bearing face 20 by a radial tooth 22 arranged to remain in engagement with a rim 24 of the crank arm, in any crank connecting rod operating position.

The arm 10 depends from the open end 25 of a cylindrical barrel 26 having the axis X—X (see FIGS. 1-3); the arm 10 extends perpendicular to this axis X—X.

At its other end 28, the cylindrical barrel 26 is attached to an end 30 and to the swivel shaft 12, which can be made integral with some device, such as a ventilation louver (not shown).

The crank arm 10 is limited by two edges 50 and 52, which on one end are connected at a tangent to the end 25 of the barrel 26 and on the other are connected to one another by the aforementioned rim 24. This rim is a flange in the form of an arc of a circle centered on the axis Y—Y of the pivot 14 and inscribed on an angle slightly less than 180°. The edges 50 and 52 and the rim 24 are of the same width and are formed directly in the width of the arm 10, the latter having a face 54 from which the pivot 14 depends and an opposed face 56 from which a skirt 58 depends. The skirt 58 (see FIGS. 2-4) includes two bands 60 and 62 which extend parallel to and spaced apart from the edges 50 and 52. These bands are connected on the one hand to the cylindrical barrel 26 and on the other to an element 64, in the form of an arc of a circle, which is coaxial with the axis Y—Y and extends spaced apart from the rim 24.

The pivot 14 (FIG. 3) includes a flat cylinder 66, shaped like a washer and forming one of the elements of the crank connecting rod bearing face 20; a cylinder 68, smaller in diameter than the cylinder 66; a cylinder 70, smaller in diameter than the cylinder 68; and a frustoconical portion 72 that embodies the free end of the pivot. The cylinders 66, 68, 70 and the frustoconical portion 72 are all within the extensions of one another and are disposed coaxially with the axis Y—Y.

The connecting rod 16 (FIG. 5) includes a body 74, for example cylindrical in shape, in the form of a rod one end 76 of which includes a coaxial cylindrical portion 78 of greater diameter than that of the body 74. The end 76 and the cylindrical portion 78 comprise means for fixing the connecting rod at the end of the rod of an actuator, as described in French patent application No. 86 08578, filed by the present Applicant on June 13, 1986.

At its opposite end 80, the connecting rod 16 includes a cylindrical barrel 82, the axis Z—Z of which is perpendicular to the axis of the cylindrical body 74 (see FIGS. 5, 6 and 9). The barrel 82 is limited by an annular face 84 arranged to cooperate with the annular surface of the cylinder 66 of the pivot 14 (see FIG. 3) in order to form the aforementioned bearing face 20. On its other end, the barrel 82 is limited by an annular face 86 extending parallel to the face 84. The barrel 82 is hollowed out on the inside to form a cylindrical hole 88 that opens onto the annular face 84 and a cylindrical hole 90, of smaller diameter, that opens onto the annular face 86. The holes 88 and 90 are located in the extension of one another and are coaxial with the axis Z—Z.

They are intended for receiving the cylinders 68 and 70, respectively, of the pivot 14 (see FIG. 3).

The barrel 82 is also connected to the cylindrical body 74 by two triangular ribs 92 and 94 (see FIGS. 5, 6 and 10).

The extension 18, extended by the radial tooth 22, is part of an element in the form of a square, which depends from the barrel 82. The first leg of the square is embodied by two parallel elements $96_1$, $96_2$ which depend from the barrel 82 of the connecting rod 16 and are connected at a right angle to the two elements $98_1$, $98_2$, respectively, which are parallel to one another and comprise the second leg of the square, or in other words of the extension 18. These two elements are joined together at their free end by a spacer 100, which carries the radial tooth 22.

The two elements $96_1$, $96_2$ extend perpendicular to the axis of the cylindrical body 74 of the connecting rod and perpendicular to the axis Z—Z of the cylindrical stepped hole made in the barrel 82 (FIGS. 5-9).

Furthermore, a connecting element 102 (FIGS. 5-9) is provided for connecting the two elements $96_1$, $96_2$ of the first leg of the square (FIG. 5). This connecting element, the presence of which is not indispensable, makes it possible to reinforce the structure of the square, each of the legs of which is embodied by two elements parallel to one another.

The design of the square, in which each of the legs is embodied by two elements, is particularly advantageous, because it makes it possible to lend the square greater elasticity, as well as to make the connecting rod by molding it in only one piece, using some suitable material such as plastic.

To enable withdrawing, the respective internal faces $104_1$, $104_2$ of the two elements $96_1$, $96_2$ and the respective internal faces $106_1$, $106_2$ of the elements $98_1$, $98_2$ are clear of one another (see FIGS. 7 and 8). An elastically deformable square is thus obtained, for permitting the clearance of the radial tooth 22 with respect to the axis Y—Y of the pivot 14 (which coincides with the axis Z—Z of the barrel 82 of the connecting rod) during the mounting of the connecting rod and crank, to allow the passage of the rim 24 of the crank arm 10 and then to permit the return of the radial tooth 22 to its initial position, so that it can engage the rim 24 and be clipped thereon.

To this end, the retaining tooth 22 includes an entry face 108 (FIG. 9) which is inclined by approximately 45° with respect to the plane defined by the annular face 84 of the barrel 82. It is this entry face 108 that cooperates with the rim 24 of the connecting rod, when the unit is mounted, and which is thus spaced apart progressively from the axis Z—Z.

The entry face 108 is extended by a rounded edge 110 in the form of an arc of a circle the generatrices of which are parallel to the axis Z—Z. This rounded edge is connected to a stop face 112, which is shared by the tooth 22 and the spacer 100 and extends parallel to the annular face 84, and hence perpendicular to the axis Z—Z of the barrel 82, which when the device is mounted coincides with the axis Y—Y of the pivot 14.

After the pivot 14 is introduced completely into the hole in the barrel 82 of the connecting rod, the tooth 22 returns elastically to its position of repose, so that it is the face 112 that comes to engage the rim 24 of the crank arm 10. The abutting cooperation of the face 112 and the rim 24 prevents any separation of the crank arm and the connecting rod, in any operating position of the crank connecting rod. Because the rim 24 is inscribed in an angle slightly less than 180°, the maximum clearance angle defined by the set of operating positions of the connecting rod and crank is thus slightly less than 180°. This clearance is limited on one side by the abutment of the element $98_1$ of the square against the edge 52 of the crank arm, and on the other side by the abutment of the element $98_2$ of the square against the edge 50 of the crank arm.

If it is desired to separate the crank arm and the connecting rod, it is sufficient to exert a slight force against the tooth 22 to move it away from the axis Z—Z, so that it is no longer abutting the rim 24 of the crank arm and the pivot 14 will leave the hole made in the barrel 82 of the connecting rod.

It should be noted that the rim 24 may be formed directly in the width of the connecting rod, without requiring that a skirt be provided as in the case of the embodiment described above.

In another variant, the tooth may engage a notch or groove provided on the periphery of the crank arm.

In the embodiment described, the crank arm 10 and the connecting rod 16 are advantageously each made in a single piece by molding from a suitable plastic material.

What is claimed is:

1. A device of the crank connecting rod type, including a crank arm (10) capable of being mounted to swivel about an axis (X—X) and provided with a pivot (14) having a pivot axis (Y—Y), and a connecting rod (16), said connecting rod (16) being pivotally received on said pivot and including an extension (18) which is parallel to the axis of the pivot (14) and is extended, beyond a connecting rod bearing face (20) between the connecting rod and pivot, by a radial tooth (22) arranged to remain in engagement with a rim (24), defined on said crank arm about said pivot, in any operating position of the connecting rod, said extension (18) comprising a first leg ($96_1$, $96_2$) extending from the connecting rod (16) perpendicular to the axis of the pivot (14), and a second leg ($98_1$, $98_2$) at right angles to the first leg, said extension being elastically deformable, to permit the spacing apart of the radial tooth (22) with respect to the axis (Y—Y) of the pivot (14) during the mounting of the connecting rod (16) and crank (10), to allow the passage at the rim (24) of the crank arm and the return of the radial tooth (22) to its initial position of repose to engage the rim (24) and be clipped thereon.

2. A device as defined by claim 1, characterized in that the radial tooth (22) includes as inclined entry face (108) arranged to cooperate with the rim (24) of the crank arm (10) for effecting the spacing apart of the radial tooth (22) at the time the connecting rod and crank arm are mounted, as well as a stop face (112) extending in a plane perpendicular to the axis (Y—Y) of the pivot (14) and arranged to enter into engagement with the rim (24).

3. A device of the crank connecting rod type, including a crank arm (10) capable of being mounted to swivel about an axis (X—X) and provided with a pivot (14) having a pivot axis (Y—Y), and a connecting rod (16), said connecting rod (16) being pivotally received on said pivot and including an extension (18) which is parallel to the axis of the pivot (14) and is extended, beyond a connection rod bearing face (20) between the connecting rod and pivot, by a radial tooth (22) arranged to remain in engagement with a rim (24), defined on said crank arm about said pivot, in any operating position of the connecting rod, said extension comprising a first leg ($96_1$, $96_2$) extending from the connecting rod (16) perpendicular to the axis of the pivot (14), and a second leg ($98_1$, $98_2$) at right angles to the first leg, said first leg and the second leg are each made of two parallel elements, the elements ($96_1$, $96_2$) of the first leg extending from the connecting rod (16) and the two elements ($98_1$, $98_2$) of the second leg joined and extending from the two elements of the first leg and terminating in free ends, the two elements of the second leg being joined together at their free ends to form the radial tooth (22).

4. A device as defined by claim 3, characterized in that a connecting element (102) connects the two elements ($96_1$, $96_2$) of the first leg in the vicinity of the joinder with the two elements of the second leg.

5. A device as defined by claims 3 or 4, characterized in that the extension is elastically deformable, to permit the spacing apart of the radial tooth (22) with respect to the axis (Y—Y) of the pivot (14) during the mounting of the connecting rod (16) and crank arm (10), to allow the passage at the rim (24) of the crank arm and the return of the radial tooth (22) to its initial position of repose to engage the rim (24) and be clipped thereon.

6. A device as defined by claim 5, characterized in that the radial tooth (22) includes an inclined entry face (108) arranged to cooperate with the rim (24) of the crank arm (10) for effecting the spacing apart of the radial tooth (22) at the time the connecting rod and crank arm are mounted, as well as a stop face (112) extending in a plane perpendicular to the axis (Y—Y) of the pivot (14) and arranged to enter into engagement with the rim (24).

7. A device as defined by claim 3, characterized in that the rim (24) of the crank arm (10) is in the form of an arc of a circle centered on the axis (Y—Y) of the pivot (14) and inscribed in an angle at least equal to the maximum clearance angle defined by the set of crank connecting rod operating positions.

8. A device as defined by claim 3, characterized in that the rim (24) is a flange extending along the periphery of the crank arm (10).

9. A device as defined by claim 3, characterized in that the rim (24) is formed directly in the width of the crank arm (10).

10. A device as defined by claim 3, characterized in that the connecting rod (16) includes means (76, 78) at one end for its fixation to the end of the rod of an actuator.

* * * * *